United States Patent [19]
Hansen

[11] 3,750,213
[45] Aug. 7, 1973

[54] SIDE WINDOW BRUSH ARRANGEMENT FOR CAR WASHING INSTALLATIONS
[75] Inventor: Niels S. Hansen, Fort Wayne, Ind.
[73] Assignee: Foundation and Bridge Corp., Fort Wayne, Ind.
[22] Filed: Aug. 13, 1971
[21] Appl. No.: 176,359

[52] U.S. Cl. .............................. 15/21 D, 15/DIG. 2
[51] Int. Cl. .............................................. B60s 3/06
[58] Field of Search ...................... 15/DIG. 2, 21 C, 15/21 D, 21 E, 53, 97, 179, 183

[56] References Cited
UNITED STATES PATENTS

| | | | |
|---|---|---|---|
| 2,822,564 | 2/1958 | Crivelli | 15/DIG. 2 |
| 2,910,202 | 10/1959 | Clarke et al. | 15/DIG. 2 |
| 2,921,329 | 1/1960 | Peterson | 15/182 |
| 3,090,981 | 5/1963 | Vani et al. | 15/21 D |
| 3,520,013 | 7/1970 | Gougoulas | 15/21 C |
| 3,540,069 | 11/1970 | Grant | 15/21 D |
| 3,643,272 | 2/1972 | Rickel | 15/21 D |
| 3,649,980 | 3/1972 | Ebeling | 15/21 D |

OTHER PUBLICATIONS
Auto Laundry News – May, 1969 – Page 2

Primary Examiner—Edward L. Roberts
Attorney—Jeffers & Rickert

[57] ABSTRACT

The invention discloses a brush arrangement for washing the side windows of vehicles passing through a car washing installation. Each side window brush is mounted on a bracket arrangement for adjustment toward and away from the path of the vehicle and vertically with reference to the vehicle and also so as to be inclinable to the vehicle. The brush is mounted on a carriage which is actuated by the vehicle moving through the installation to move the brush laterally of the vehicle path to position the brush in operative relation with the windows to be washed thereby. The brush is driven in rotation and is supplied internally with a washing medium. The carriage supporting the brush can also include a manifold for supplying washing medium to the lower body and wheels of the vehicle as it passes by the carriage.

8 Claims, 6 Drawing Figures

INVENTOR
NIELS S. HANSEN
by Jeffers & Rickert
Attorneys

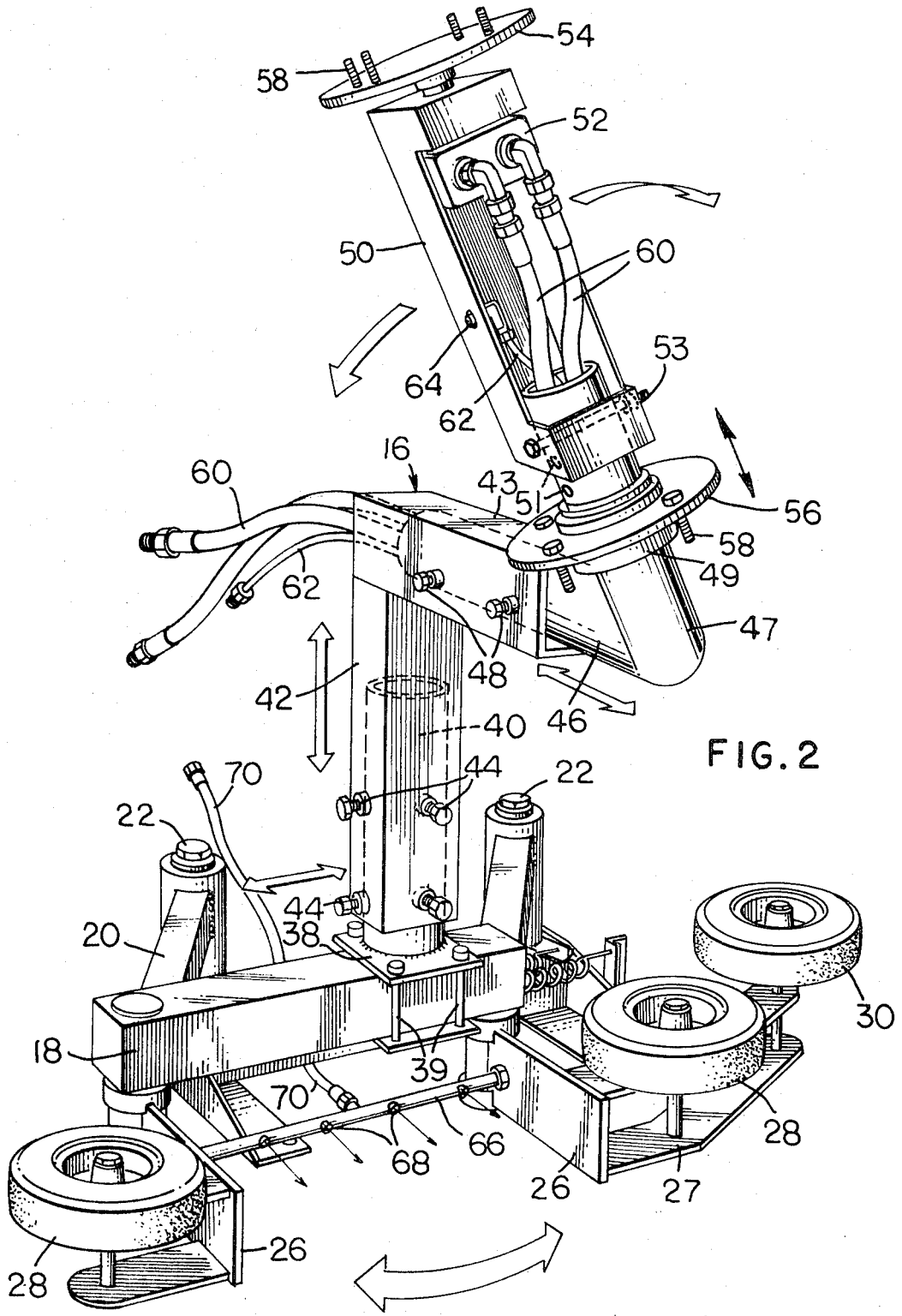

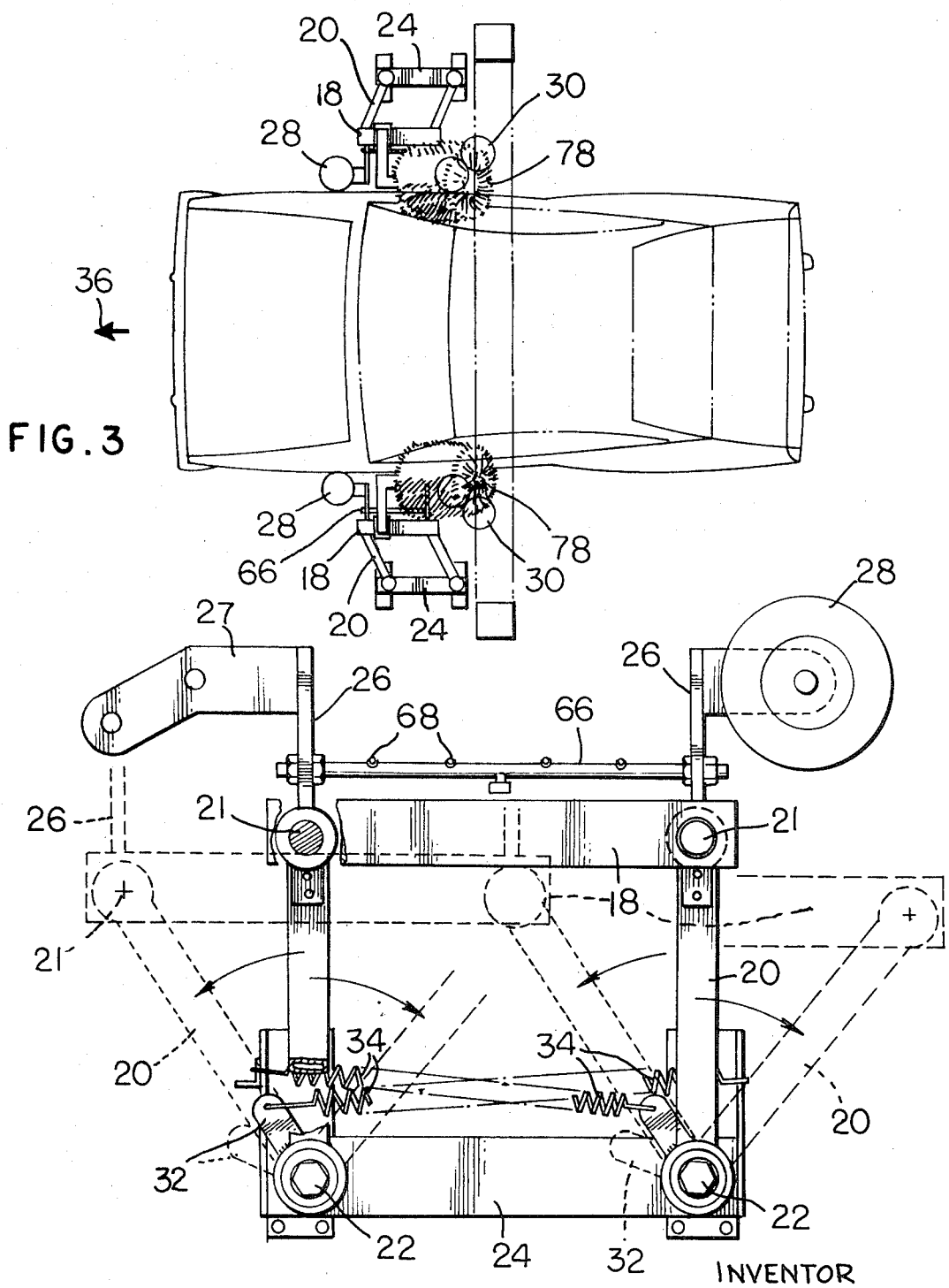

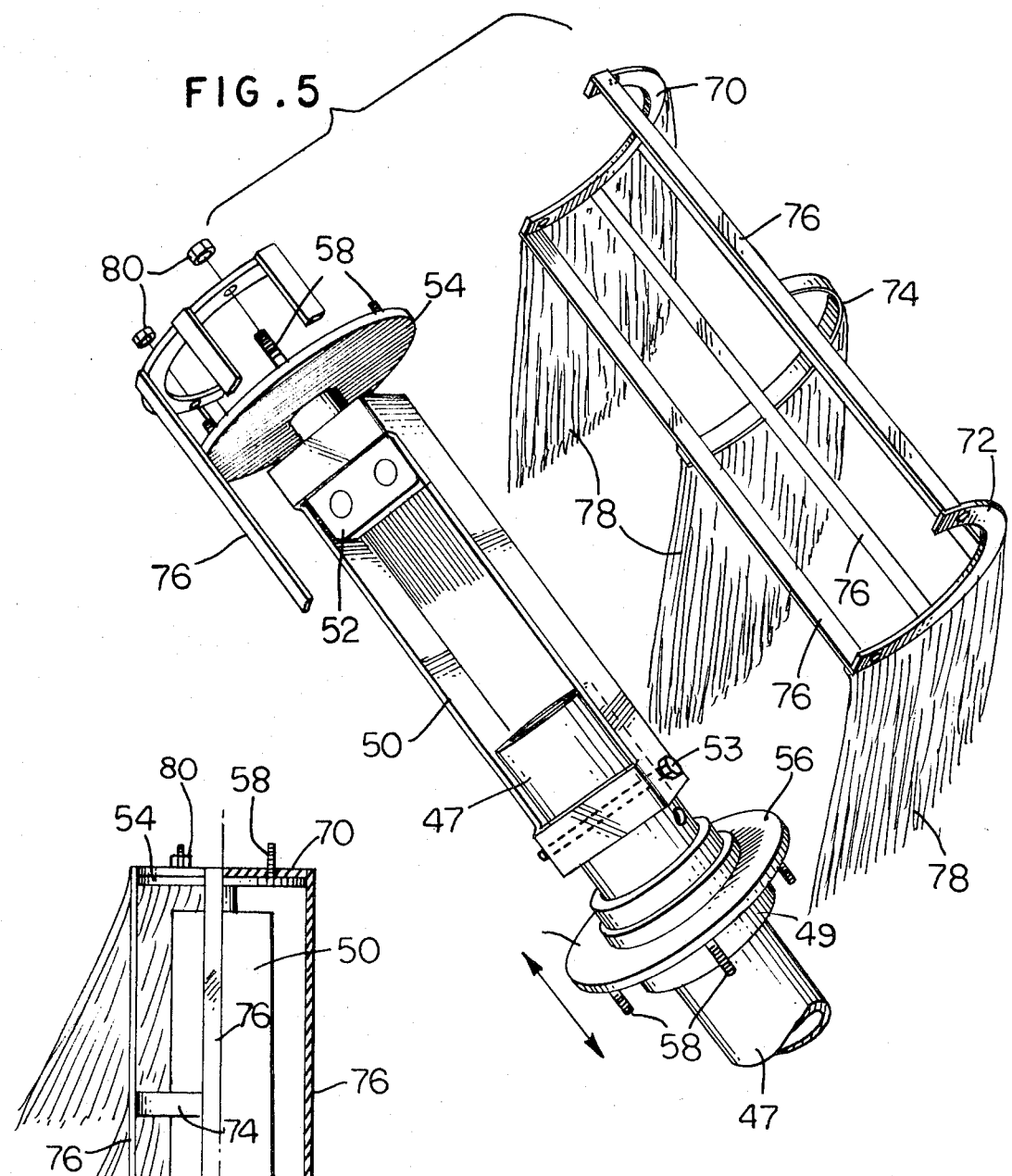

SIDE WINDOW BRUSH ARRANGEMENT FOR CAR WASHING INSTALLATIONS

The present invention relates to a car washing installation and is particularly concerned with a brush arrangement for washing the side windows of a vehicle passing through the car washing installation.

Brushes are known for brushing the sides of the vehicle passing through an installation and, usually, such brushes extend the full heighth of the vehicle and brush the sides and side windows thereof. Many times, the side windows of a vehicle are inclined at a substantial angle to the side walls of the vehicle, and such brushes do not always, therefore, properly treat the side window area.

With the foregoing in mind, a particular object of the present invention is the provision of a brush for a car washing installation especially for treating the side window areas of the vehicle.

Another object is the provision of a brush for treating the side window areas of a vehicle moving through a car washing installation in which the brush is readily adjustable to accommodate the brush to different circumstances.

Still another object of the invention is the provision of a brush for treating the side window areas of a vehicle passing through a car washing installation in which the vehicle itself adjusts the brush in the lateral direction of the vehicle path to bring the brush into operative relation with the window areas to be treated.

A further object of the invention is the provision of a side window brush for an automatic car washing device in which at least five adjustments can be made to position the brush with respect to the vehicle.

It is also an object to provide a side window treating brush of the nature referred to in which the brush itself is of a novel design and can readily be mounted on or removed from the support therefor when desirable or necessary.

The foregoing objects as well as still other objects and advantages of the present invention will become more apparent upon reference to the following detailed specification taken in connection with the accompanying drawings in which:

FIG. 2 is a perspective view drawn at enlarged scale showing the supporting structure for the side window treating brush from the vehicle side thereof and with the brush itself removed from the supporting structure;

FIG. 3 is a plan view looking down on top of a typical installation;

FIG. 4 is a plan view of one of the brush supporting structures drawn at enlarged scale and with the brush and the bracket arrangement which connects it to the supporting structure removed;

FIG. 5 is a perspective view showing a brush according to the present invention and the supporting arrangement therefor partly disassembled; and FIG. 6 is a side view, partly in section, showing a brush according to the present invention.

BRIEF SUMMARY OF THE INVENTION

Figure 1:
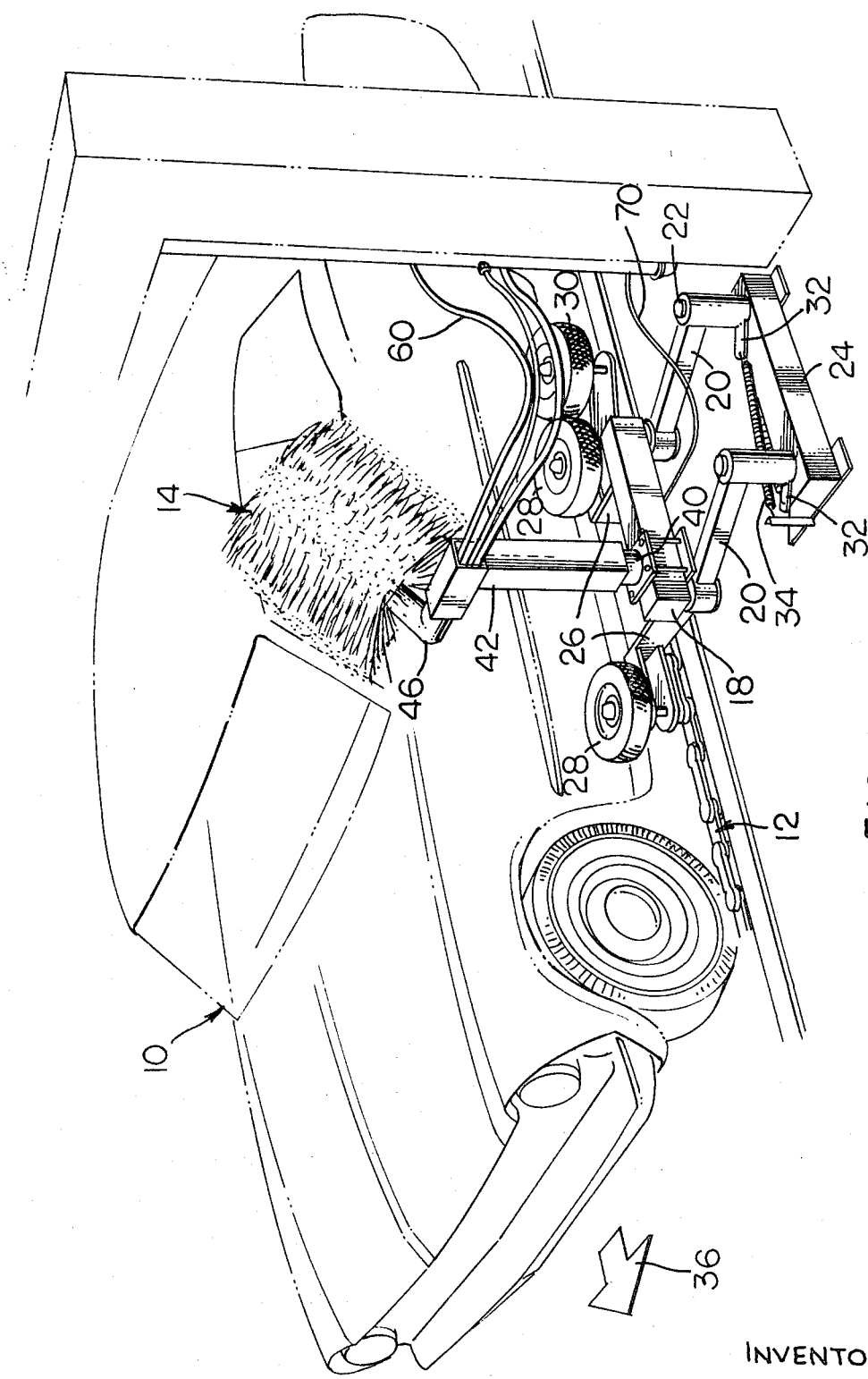
FIG. 1 is a somewhat schematic perspective view of a portion of a car washing installation showing a vehicle passing therethrough and a side window treating brush and a supporting structure therefor according to the present invention.

According to the present invention, a brush for treating the side window areas of a vehicle is provided, positioned at about the level of the windows and adjustably supported for being raised or lowered or moved toward and away from the path along which the vehicle moves or for being tilted in a vertical plane parallel to the vehicle path.

The support for the brush includes a carriage supported for movement in parallelism with itself toward and away from the path and having guide wheels in contact with the vehicle so that as the vehicle advances along the path, the side window treating brushes will be automatically adjusted into proper operative position relative to the side windows. The brush is driven in rotation, as by a hydraulic motor, and is supplied with washing medium internally thereof.

DETAILED DESCRIPTION OF THE INVENTION

Referring to the drawings somewhat more in detail, the car washing installation fragmentarily illustrated therein comprises a vehicle path along which a vehicle 10 is moved at controlled speed by conveyor or pusher chain 12 in a manner common in known car washing installations. Adjacent the path of the vehicle, at a certain point therealong, is a brush 14 on each side of the vehicle adapted for treating the side window areas of the vehicle.

Brush 14 is rotatably supported on bracket means generally indicated at 16 and which bracket means at the bottom is supported on a beam or carriage 18 extending parallel to the vehicle path. Beam 18 near its opposite ends is pivoted to the one end of each of a pair of levers 20 which extend in the horizontal direction and parallel to each other outwardly from beam 18 and have their other ends pivoted on support posts 22 upstanding from opposite ends of a base member 24 adapted for being fixedly secured to the adjacent floor region.

Beam 18 is a portion of a structure which comprises arm elements 26 extending toward the vehicle path and having rotatably mounted thereon at the outer ends and on vertical axes, rubber tired wheels 28, which are adapted to engage the side walls of vehicle 10. On the side from which vehicle 10 approaches, an additional rubber tired wheel 30 is provided on an arm 27 and spaced further outwardly from the vehicle path than wheels 28 so as to provide an entrance through which the vehicle enters. The wheels 28 are on axes which are spaced in a vertical plane parallel to the vehicle path.

Each of the arms 20 at the ends which engage the pivot post 22 is provided with a spring anchor 32 and from each spring anchor to a portion of the base 24 there extends a tension spring 34. The beam 18 and the parts connected thereto are thus resiliently supported for movement in parallel with themselves toward and away from the vehicle path.

The brush 14 is adjusted relative to wheels 28 so that as the vehicle 10 moves along the vehicle path in the direction of arrow 36, the supporting structures for the brushes 14 will be moved laterally outwardly from the vehicle path and position the brushes 14 in proper operative relation to the side window areas to be washed thereby.

FIG. 2 shows more in detail the construction of the supporting structure for the brush. In FIG. 2, it will be seen that beam 18 has a frame part 38 clamped thereto by bolts 39 so that the frame part 38 can be adjusted along the length of the beam, and which clamped part comprises an upstanding column 40. Upstanding column 40 is receivable in the vertical leg of a first bracket member 42 and is held in adjusted position as by clamp screws 44.

Bracket 42 has a horizontal upper leg 43 into which extends a horizontal leg of another bracket member 46, and which is held in adjusted and rotated positions in the horizontal leg 43 of bracket 42 as by screws 48. Bracket 46 has an upstanding leg 47 at the outer end of the horizontal leg and on which the brush 14 is rotatably mounted. Upstanding leg 47 has a frame member 50 fixed thereto and projecting upwardly therefrom and within which is mounted a fluid operable rotary motor 52 that drives a flange 54 in rotation. The frame member 50 is adjustable with respect to the upstanding leg 47 by providing spaced openings 51 in the leg 47 for receiving the bolt 53.

Spaced from flange 54 is a second flange 56 which is rotatable and reciprocable on the upstanding leg 47 of bracket 46. The second flange 56 is provided with a Teflon (tetrafluoroethylene compound) bearing 49 which requires no lubrication. Each flange has studs 58 in circumferentially spaced relation extending outwardly from the side thereof which faces away from the other of the flanges. These studs are for the purpose of securing the brush to the flanges to be driven in rotation by motor driven flange 54.

Fluid is conducted to fluid motor 52 by conduit means 60 which extends through leg 47 and bracket 46 and which, to this end, is preferably a tubular member, and out through the end of the upper leg 43 of bracket 42. A further conduit 62 is led through the brackets into frame 50 and terminates in a nozzle 64 for the supply of washing medium to the inside of the brush.

As will be seen in FIG. 2, the outwardly projecting portions 26, which provide support for the wheels 28 and 30, can be availed of for supporting a manifold 66 extending parallel to the vehicle path and provided with nozzles 68 and with a supply conduit 70. Manifold 66 will supply jets of washing medium to the sides of a vehicle, particularly at about the level of the wheels thereof.

As will be seen in FIG. 3, there is advantageously a brush and a supporting structure therefor on each side of the path taken by the vehicle with each of the side window treating arrangements substantially identically constructed and being mirror images of each other.

The brush 14 according to the present invention is of novel construction and is illustrated in some detail in FIGS. 5 and 6. In these views, it will be noted that the brush is made in segments with each segment comprising axially spaced semi-circular end rings 70 and 72 and a semicircular intermediate ring 74 with circumferentially distributed axial bars 76 interconnecting the rings.

At least from the rings 70, 72 and 74 there extend the flexible filaments 78 which form the bristles of the brush. These filaments are soft and flexible and do not in any way damage the painted areas or window areas of the vehicle. Such filament arrangements are known in the vehicle washing art.

When the brush is assembled on its supporting structure, the flange 56 is moved upwardly on the upstanding leg 47 of bracket 46 and this permits end ring 70 of each segment to be engaged with the studs 58 on flange 54. Thereafter, flange 56 is moved downwardly so that the studs 58 thereon will engage with the apertures in end ring 72. Finally, nuts 80 may be placed on the studs to lock the brush in place.

In operation, the brushes can rotate continuously during operation of the car washing installation, or they can be arranged to commence rotating as a vehicle approaches the side window area brush arrangement and then cease rotation after the vehicle passes the side window area brush arrangement. This could readily be accomplished by the use of limit switches or other detecting devices, also well known in the automatic car washing art.

Persons skilled in the art will appreciate that modifications may be made in accordance with my invention. For example, the arm 27 and the wheel 30 can be eliminated on the carriage 18 opposite the conveyor, if desired. The wheel 30, disposed on the carriage opposite the conveyor, will make an initial adjustment of the carriage as the vehicle approaches the car washer device, and the wheels 28 will make the final adjustment according to the width of the automobile being serviced. In some cases it may be desirable to have a ledge brush, which is approximately 4 inches wide, in addition to the window brush, for cleaning the door panel adjacent the window on such cars as the Lincoln Continental. In such cases the ledge brush can be mounted on the same adjustable apparatus that is used for the side window brush. Therefore, while my invention has been described with reference to a particular embodiment, it is to be understood that modifications may be made without departing from the spirit of my invention.

I claim:

1. In a car wash having a path along which a vehicle is guided during a washing operation; a device for washing the side window areas on each side of the vehicle, each device comprising a carriage on the respective side of said path, support means supporting the carriage for movement in a horizontal plane toward and away from said path, a brush, first and second bracket means rotatably supporting said brush at the level of the window areas to be washed, connecting means including an upstanding support member on said carriage, said first bracket means including a first dependent leg secured to said upstanding support member and having a second horizontal leg projecting toward said path, said second bracket means including a first horizontal leg connected to the second leg of said first bracket means and having a second leg upstanding from the end of the said first leg thereof at the end nearest said path and on which said brush is rotatably mounted, said first leg of said first bracket means being adjustable vertically and angularly on said upstanding support member and said first leg of said second bracket means being adjustable on said second leg of said first bracket means angularly thereof and in the direction of the length thereof, and vehicle operated means on said carriage operable by a vehicle moving along said path to move said carriage in said horizontal plane to bring said brush into operative washing relation with the side window areas on the respective side of the vehicle.

2. A car washer according to claim 1 which includes a frame member carried by said second leg of said second bracket means, said frame member disposed within said brush and provided with means for supplying a washing medium to said brush from the inside thereof.

3. A car washer according to claim 1 in which said carriage is guided so as to move in parallelism with itself toward and away from said path, and said vehicle operated means including a pair of wheels spaced horizontally in a direction parallel to said path and having the axes thereon in a plane parallel to said path and a further wheel spaced from said pair of wheels on the side from which a vehicle approaches said path and located farther outwardly from said path than said pair of wheels.

4. A car washer according to claim 2 wherein said frame member carries a first rotatable flange member at one end, motor means mounted in said frame and connected to drive said rotatable flange member, a second rotatable flange member slidably mounted on said second leg of said second bracket means, and said brush including segments adapted to be placed together about said first and second rotatable flange members and connected thereto.

5. A car washer according to claim 4 in which said motor is fluid operable, said bracket means including a hollow portion, and conduits for hydraulic fluid and for washing medium leading through said hollow portion to said fluid motor and to the inside of said brush.

6. A car washer according to claim 4 in which each brush segment comprises axially spaced partial ring members and circumferentially spaced longitudinal bars interconnecting said partial ring members, and elongated flexible elements connected at one end to said partial ring members.

7. A car washer according to claim 6 in which the end ones of said partial ring members have circumferentially distributed apertures therein, said flange means comprising circumferentially distributed studs projecting axially from the sides thereof which face away from each other and receivable in said apertures, and means to fix said partial ring members to said flange means.

8. A car washer according to claim 11 which includes a spray manifold on said carriage parallel to said path and positioned at about the level of the vehicle wheels, and means for supplying washing medium under pressure to said manifold.

* * * * *

UNITED STATES PATENT OFFICE
CERTIFICATE OF CORRECTION

Patent No. 3,750,213  Dated August 7, 1973

Inventor(s) Niels S. Hansen

It is certified that error appears in the above-identified patent and that said Letters Patent are hereby corrected as shown below:

Col.6, line 16 (Claim 8) "claim 11" should be --- claim 1 ---

Signed and sealed this 30th day of July 1974.

(SEAL)
Attest:

McCOY M. GIBSON, JR.
Attesting Officer

C. MARSHALL DANN
Commissioner of Patents